(12) United States Patent
Watanabe et al.

(10) Patent No.: US 6,471,307 B2
(45) Date of Patent: Oct. 29, 2002

(54) CRAWLER BELT TYPE TRAVELING SYSTEM

(75) Inventors: Hiroaki Watanabe; Kazuo Yasojima, both of Ishikawa (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 09/879,155

(22) Filed: Jun. 13, 2001

(65) Prior Publication Data

US 2002/0047306 A1 Apr. 25, 2002

(30) Foreign Application Priority Data

Jun. 28, 2000  (JP) ........................................ 2000-194359

(51) Int. Cl.$^7$ .............................................. B60B 37/00
(52) U.S. Cl. ........................ 305/193; 305/194; 305/197
(58) Field of Search ................................ 305/193, 194, 305/197, 198, 170, 171, 173, 174, 175, 177, 56, 38

(56) References Cited

U.S. PATENT DOCUMENTS

| | | | | |
|---|---|---|---|---|
| 1,627,287 A | * | 5/1927 | Kagresse | 305/193 |
| 3,504,951 A | * | 4/1970 | Hirych | 305/193 |
| 4,904,030 A | * | 2/1990 | Ono | 305/56 |
| 5,131,728 A | * | 7/1992 | Katoh et al. | 305/193 |
| 5,131,731 A | * | 7/1992 | Johnson | 305/56 |
| 5,308,155 A | * | 5/1994 | Katoh | 305/38 |
| 5,368,376 A | * | 11/1994 | Edwards et al. | 305/56 |
| 6,206,492 B1 | * | 3/2001 | Moser | 305/194 |
| 6,267,459 B1 | * | 7/2001 | Becker et al. | 301/193 |
| 6,299,264 B1 | * | 10/2001 | Kautsch et al. | 301/193 |

FOREIGN PATENT DOCUMENTS

JP      2000-095158      4/2000

* cited by examiner

*Primary Examiner*—S. Joseph Morano
*Assistant Examiner*—Long Bao Nguyen
(74) *Attorney, Agent, or Firm*—Rader, Fishman, & Grauer PLLC; Ronald P. Kananen. Esq.

(57) ABSTRACT

A crawler belt type traveling system which ensures improved durability in the portions near road wheel rolling contact sections. The system comprises crawler belts formed from an elastic material such as rubber and road wheels attached to a vehicle body. Each crawler belt has core bars embedded therein so as to be aligned at specified intervals in a longitudinal direction of the crawler belt. Each core bar has a pair of guide projections at the center thereof with respect to a widthwise direction of the crawler belt, the pair of guide projections being aligned in a widthwise direction of the crawler belt. Provided at both sides of the pair of guide projections are road wheel rolling contact sections. Each road wheel comes into contact with the road wheel rolling contact sections, for supporting each crawler belt. In such a system, the tread of each road wheel comes into contact with the road wheel rolling contact sections of the crawler belt, being away from the root parts of the guide projections of the crawler belt.

6 Claims, 8 Drawing Sheets

(a)

(b)

(c)

(a)

(b)

CRAWLER BELT TYPE TRAVELING SYSTEM

TECHNICAL FIELD

The present invention relates to a crawler belt type traveling system adapted for use mainly in construction machines such as crawler dump trucks and hydraulic shovels or in agricultural machinery.

BACKGROUND ART

There have been conventionally used construction machine vehicles and agricultural machine vehicles, which are equipped with a crawler belt type traveling system, the system comprising crawler belts made from an elastic material such as rubber for improving ride qualities and reducing noise during traveling. Such a crawler belt type traveling system includes a pair of right and left driving sprockets which are positioned on either the front or rear end of the structure underneath the vehicle. The other end is provided with a pair of right and left idlers. Generally, the right and left sides of the vehicle are respectively provided with a crawler belt which is endlessly wound around each set of the driving sprocket and the idler at their peripheries and the intermediate portion of each crawler belt is supported by a plurality of freely rotatable road wheels.

As shown in FIG. 8 which is a partial cross sectional view illustrating the relationship between a conventional crawler belt and a road wheel, a known crawler belt 100 employed in such a crawler belt type traveling system has a structure in which a crawler belt body 101 is formed in an endless fashion from rubber or an elastic material having rubber qualities and a number of core bars are embedded and aligned at specified intervals within the crawler belt body 101 in a longitudinal direction thereof. Each core bar 102 has, at the center with respect to its widthwise direction, a pair of guide projections 103 which project from the inner circumferential surface of the crawler belt (i.e., the surface opposite to the tread). Provided on the outer right and left sides of the pair of guide projections 103 are road wheel rolling contact sections 104 with which roller sections 111 of each road wheel 110 mounted on the vehicle body are respectively in contact. A shallow groove 105 is formed in an abutting part between each guide projection 103 of the core bar 102 and its associated road wheel rolling contact section 104 such that elastic deformation caused by rolling pressure and exerted on the road wheel rolling contact section 104 is prevented from directly affecting the abutting part. For easy bending of the crawler belt 100, there are formed grooves (not shown) each of which extends in a widthwise direction of the crawler belt 100, being positioned in the space between the adjacent core bars 102 embedded so as to be aligned at specified intervals in the longitudinal direction of the crawler belt 100.

When the vehicle travels on the unleveled ground with such crawler belts 100 while performing its operation, it often rides on stones etc. because of the irregular treads of the road wheels, so that a load is imposed on either the right or left side of the crawler belts with respect to the widthwise direction of the crawler belts. If a load is repeatedly imposed on one side, an excessive pressing force is locally exerted upon the road wheel rolling contact sections 104 on which the road wheels 110 (consisting of a plurality of crawler belt supporting rollers) roll, the road wheels 110 supporting the crawler belts from inside at the intermediate portion thereof This causes immoderate external force working on the abutting part between each road wheel rolling contact section 104 and a side of each guide projection 103 of the core bars 102 adjacent to the road wheel rolling contact section 104.

If such an undesirable situation repeatedly occurs, cracks are generated around the boundary between each guide projection 103 and the crawler belt body 101 owing to the local pressing force working on the road wheel rolling contact sections 104 of the crawler belt body 101. Once cracking occurs, peeling of the elastic material such as rubber develops from the cracked part, resulting in breakage of the crawler belt at the early stage.

As seen from FIG. 8, the above phenomenon is supposed to be caused for the following reason: As the road wheels 110 roll near the root parts of the guide projections 103 of the core bars 102, an excessive pressing force is generated, working on the portions where the elastic material (e.g., rubber) of the crawler belt body 101 is adhered to the side face of the guide projection 103 of each core bar 102 so that a load, which exceeds the shearing stress of the adhesive layer and the limit of the elasticity of the elastic material (e.g., rubber), is repeatedly exerted.

The present invention is directed to overcoming the above problem and a prime object of the invention is therefore to provide a crawler belt type traveling system having crawler belts of improved durability.

DISCLOSURE OF THE INVENTION

The above object can be achieved by a crawler belt type traveling system according to a first aspect of the invention comprising:

crawler belts formed from an elastic material, each crawler belt having core bars embedded therein so as to be aligned at specified intervals in a longitudinal direction of the crawler belt, the core bars each having a pair of guide projections at the center thereof with respect to a widthwise direction of the crawler belt, the pair of guide projections being aligned in a widthwise direction of the crawler belt, and road wheels each attached to a vehicle body so as to come into rolling contact with a portion outside the pair of guide projections, wherein each road wheel rolls on road wheel rolling contact sections of each crawler belt with its tread being away from the crawler belt side of a root part of each guide projection.

According to the invention, the tread of each road wheel, which is in contact with road wheel rolling contact sections of a crawler belt to support and press the crawler belt against the ground for running it during traveling, rolls in a position away from the root parts of the guide projections of each core bar. This arrangement can alleviate the undesirable situation in which the elastic deformation of the road wheel rolling contact sections caused by the road wheels concentrates upon the root parts of the guide projections, so that cracking and peeling in the adhesive regions are unlikely to occur, resulting in improved durability of the crawler belts.

The traveling system of the first aspect may be designed such that the guide projection sides of the periphery of each road wheel are formed into a step-like shape so as to be apart from the root parts of the guide projection (a second aspect of the invention). In addition, the guide projection sides of each road wheel may be inclined at an angle greater than the inclination angle of the guide projections (a third aspect of the invention). With these arrangements, even if a roller section of a road wheel is offset to a guide projection side, the tread part does not come into contact with the root part of the guide projection so that an unfavorable situation can be avoided in which a load is concentrated on the regions of the road wheel rolling contact sections in the neighborhood of the root parts of the guide projections, interrupting the operation of the crawler belt which results in breakage of the crawler belt.

The traveling system of the first aspect may be modified such that the portions of each crawler belt close to the root parts of the guide projections are respectively provided with a recess which is larger than the volume of elastic deformation caused by the maximum vehicle body load which acts via the road wheel rolling contact sections (a fourth aspect of the invention). With this arrangement, even if a load is locally imposed on the road wheel rolling contact sections by the road wheels, the recesses absorb the distortion caused by the elastic deformation of the road wheel rolling contact sections (i.e., the distortion is accommodated in the recesses) so that a load concentrated on the joint parts where each guide projection joins to the elastic material can be alleviated, preventing damage to the crawler belts.

The traveling systems of the first or fourth aspect of the invention may be modified such that an irregular surface is formed at least in an adhesive interface between the elastic material and the outer surface of each guide projection of each core bar (a fifth aspect of the invention). This increases adhesion in the adhesive surfaces of the crawler belt forming elastic material (e.g., rubber) and the root part of each guide projection, which, in consequence, prevents peeling of the adhesive layer due to a local external force.

According to a sixth aspect of the invention, there is provided a crawler belt type traveling system comprising:
crawler belts formed from an elastic material, each crawler belt having core bars embedded therein so as to be aligned at specified intervals in a longitudinal direction of the crawler belt, the core bars each having a pair of guide projections at the center thereof with respect to a widthwise direction of the crawler belt, the pair of guide projections being aligned in a widthwise direction of the crawler belt, and
road wheels each attached to a vehicle body so as to come into rolling contact with a portion outside the pair of guide projections,
wherein the elastic material of each crawler belt is adhered so as to extend from the crawler belt side of a root part of each guide projection to a position having a specified height along the outer surface of the guide projection, and
wherein the guide projection sides of each road wheel are respectively formed into a step-like shape so as not to come into contact with joint parts where the elastic material joins to a guide projection.

According to the invention, an adhesive area can be increased in the elastic material joint parts where the root part of a guide projection of each core bar in each crawler belt joins to a road wheel rolling contact section of the crawler belt, thereby increasing adhesion. In addition, the area of the elastic material portions in contact with the guide projections can be increased thereby achieving reinforcement, each elastic material portion leading to a road wheel rolling contact section. For conforming to the increased area of the elastic material portions, the guide projection sides of each road wheel are formed into a stepped shape so as not to come into contact with the elastic material joint parts, thereby not only avoiding local concentration of stress, but also increasing adhesion to prevent damage to the elastic material (e.g., rubber) in the neighborhood of the root parts of the guide projections of each core bar, resulting in improved durability. In the above arrangement, more effectiveness can be achieved by providing irregularity to the outer part of the root part of each guide projection, thereby increasing adhesion.

BRIEF EXPLANATION OF THE DRAWINGS

FIG. 3($b$) is an enlarged detailed view of a fundamental part.

FIG. 3($c$) illustrates an example in which a recess is deformed owing to a load imposed on a road wheel rolling contact section.

BEST MODE FOR CARRYING OUT THE INVENTION

Referring now to the accompanying drawings, the crawler belt type traveling system of the invention will be described according to its preferred embodiments.

Figure 1:
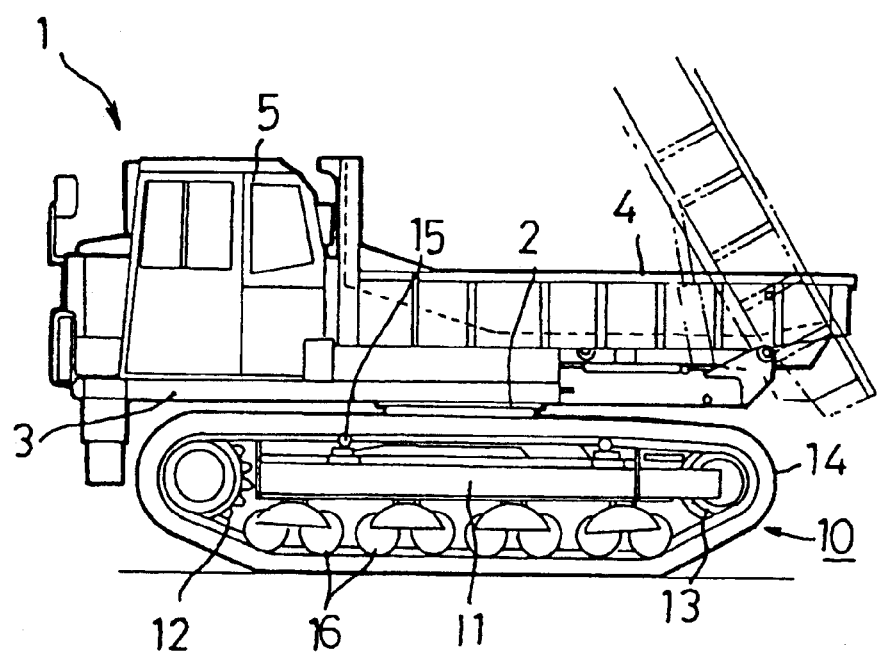
FIG. 1 is a side view of a crawler dump equipped with a crawler belt type traveling system according to one embodiment of the invention.
Figure 2:
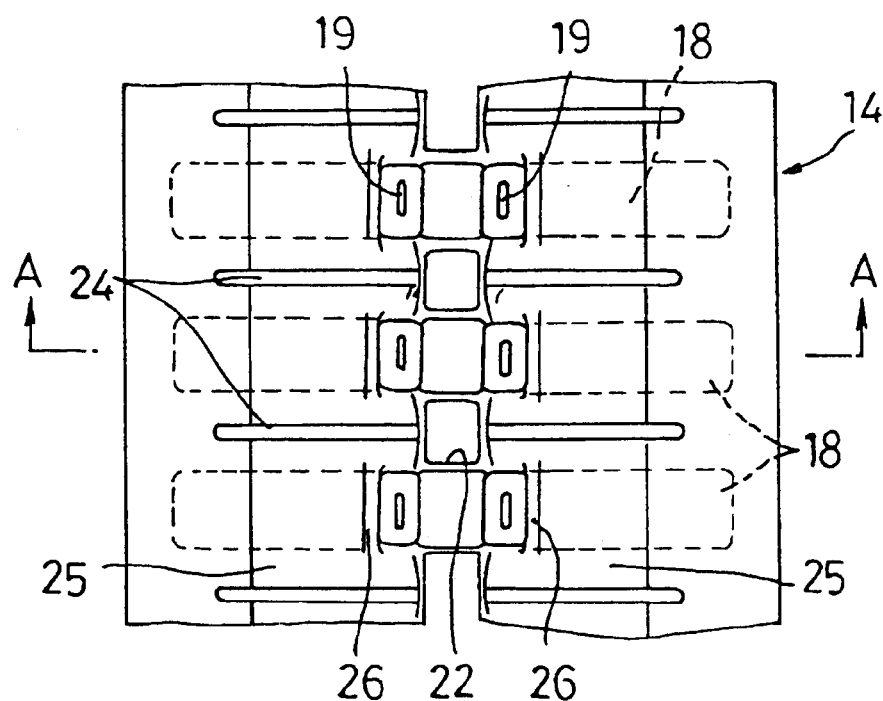
FIG. 2 is a partial plan view of a crawler belt as viewed from its inner circumferential side.
Figure 3:
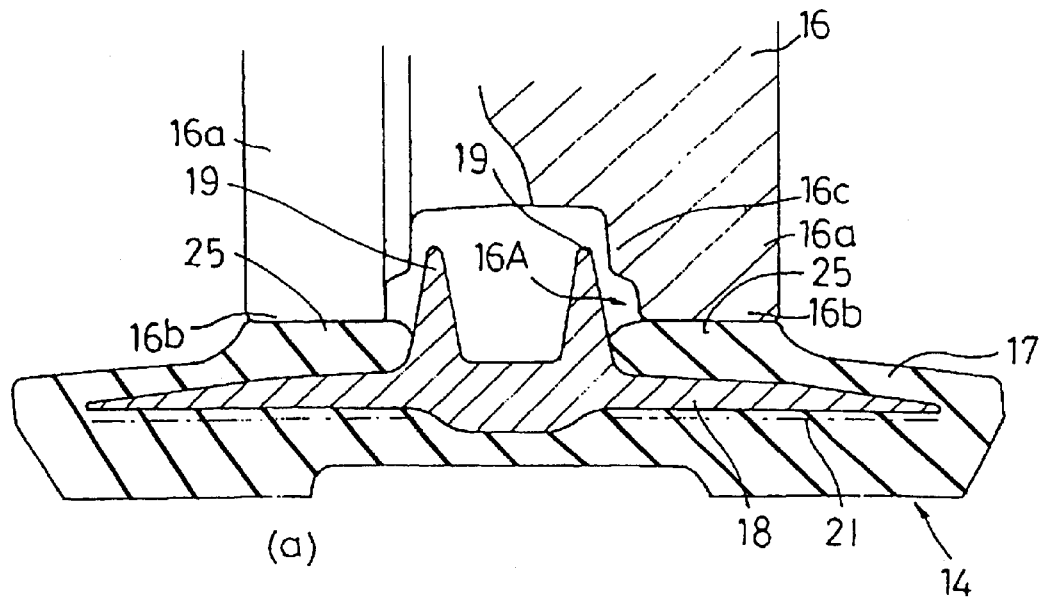
FIG. 3($a$) is an enlarged sectional view taken along line A—A of FIG. 2, which illustrates the relationship between the crawler belt and a road wheel.
Figure 3:
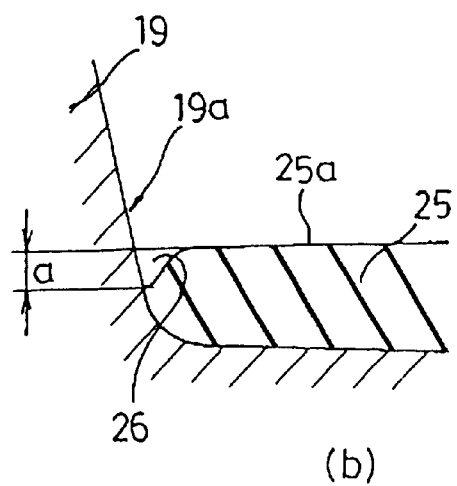
Figure 3:
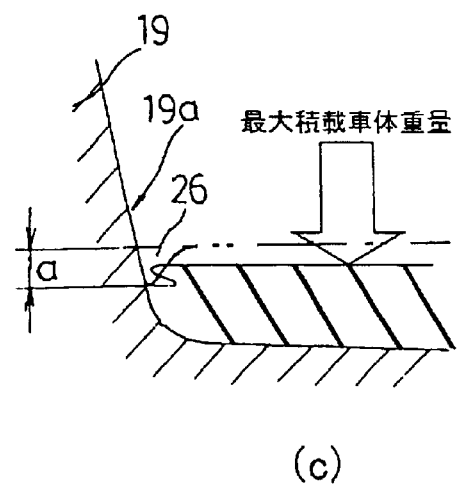

FIG. 1 shows a side view of a crawler dump equipped with a crawler belt type traveling system according to one embodiment of the invention; FIG. 2 shows a partial plan view of a crawler belt as viewed from its inner circumferential side; FIG. 3($a$) shows an enlarged sectional view taken along line A—A of FIG. 2, which illustrates the relationship between the crawler belt and a lower road wheel; FIG. 3($b$) is an enlarged detailed view of a fundamental part; and FIG. 3($c$) illustrates an example in which a recess is deformed owing to a load imposed on a road wheel rolling contact section.

A crawler belt type traveling system 10 according to the present embodiment is applied, for instance, to a crawler dump 1 shown in FIG. 1. The system 10 is formed such that a crawler belt 14 is wound around each of driving sprockets 12 and around each of idlers 13 in an endless fashion, the sprockets 12 being mounted on the right and left sides of the front end of a lower track frame 11 while the idlers 13 are mounted on the right and left sides of the rear end of the same. Each crawler belt 14 is supported at its intermediate portion by road wheels 15 positioned above the lower track frame 11 and by a plurality of road wheels 16 positioned underneath the lower track frame 11. The crawler belt type traveling system 10 is run by rotating the driving sprockets 12 with a hydraulic driving motor (not shown). A revolving superstructure 3 is mounted on the lower track frame 11 of the crawler belt type traveling system 10 through a swivel 2. Mounted on the revolving superstructure 3 are a dump load carrying platform 4, a driving section such as an engine (not shown) and a cab 5.

The crawler belts 14 of the crawler belt type traveling system 10 are made from an elastic material such as rubber and formed in an endless fashion, having the desired size. Embedded within a crawler belt body 17 of each crawler belt 14 are core bars 18 and a plurality of anti-tension members 21 such as wires. Each core bar 18 has, at its center with respect to a widthwise direction of the crawler belt 14, a pair of right and left guide projections 19 which are aligned in a widthwise direction of the crawler belt 14, projecting inwardly from the crawler belt 14. The plurality of anti-tension members 21 are aligned in a widthwise direction of the crawler belt 14, extending in a longitudinal direction of the crawler belt 14. The core bars 18 and the anti-tension members 21 are integrally formed with the crawler belt 14.

A large number of such core bars 18 are aligned at specified intervals in a longitudinal direction of the crawler belt 14. At the center of the crawler belt 14 with respect to its widthwise direction, an engagement hole 22 is defined in the space between every adjacent core bar 18, such that each engagement hole 22 engages with a tooth (not shown) of the sprockets. Lugs are attached to the outer circumferential surface (ground contact surface) of the crawler belt 14. On the inner circumferential surface of the crawler belt 14, road wheel rolling contact sections 25, with which each road wheel comes into rolling contact, are disposed at both sides of the pair of guide projections 19.

The guide projections 19 of the core bars 18 in each crawler belt 14 have a known profile. At a joint part where each road wheel rolling contact section 25 provided in the crawler belt body 17 joins to the root part of each guide projection 19, a recess 26 is formed, which has a specified depth a from a rolling contact surface 25a of the road wheel rolling contact section 25. As seen from FIG. 3(c), the depth a of the recess 26 is preferably greater than the amount of elastic deformation caused by the maximum vehicle body load of the vehicle equipped with the crawler belt type traveling system 10. Provided between every adjacent embedded core bars 18 is a groove 24 having a proper depth. The grooves 24 are aligned in a longitudinal direction of the crawler belt 14, extending in a widthwise direction of the crawler belt 14. By virtue of these grooves 24, the crawler belt 14 can be easily flexed when it is driven in a wound-around state.

As shown in FIG. 3, each of the road wheels 15, 16 rotatably attached to the lower track frame 11 sits astride the right and left guide projections 19 aligned in the crawler belt widthwise direction, such that treads 16b of roller sections 16a are respectively in rolling contact with the road wheel rolling contact sections 25 of the crawler belt 14, the rolling contact sections 25 being positioned at both sides of the pair of guide projections 19. The inner portion (guide projection side) of each roller section 16a which is close to the tread 16b is formed into a step-like shape 16A so as to be apart from a root part 19a of the associated guide projection 19. Accordingly, each roller section 16a is formed such that its tread 16b is narrower than its proximal portion 16c. The inner portion of the proximal portion 16c of the roller section 16a is designed such that if the crawler belt 14 is moved laterally, it comes into contact with the associated guide projection 19 to prevent the road wheel 16 from coming off the crawler belt 14. Although not shown in the drawings, the guide projection sides of the road wheel 15 are formed into a step-like shape, similarly to the road wheels 16.

In the embodiment having the above structure, when the crawler belt type traveling system 10 is driven to travel, the treads 16b of the roller sections 16a of the road wheels 16 come into rolling contact with their associated road wheel rolling contact sections 25, on the side where the crawler belt 14 is in contact with the ground. At that time, the tread 16b of each road wheel 16 rolls on the road wheel rolling contact section 25, being away from the root part 19a of its associated guide projection 19, the root part 19a being positioned on the side of the crawler belt 14. Therefore, if the crawler belt 14 runs on stones or the like and the road wheels 16 are strongly pressed against the road wheel rolling contact sections 25, the concentration of the load, which has been imposed on the crawler belt body 17, upon the joint parts where each guide projection 19 joins to the elastic material can be alleviated to facilitate elastic deformation, by virtue of the structure in which a recess 26a is deeply formed between each guide projection 19 of the core bars 18 embedded in the crawler belts 14 and each road wheel rolling contact section 25 and in which the inner portion (guide projection side) of each roller section 16a of the road wheel 16 has a step-like shape 16A, the inner portion being close to the tread. Thus, if such a local load is repeatedly imposed, damage to the portions near the joint parts can be prevented, resulting in improved durability.

Figure 4:
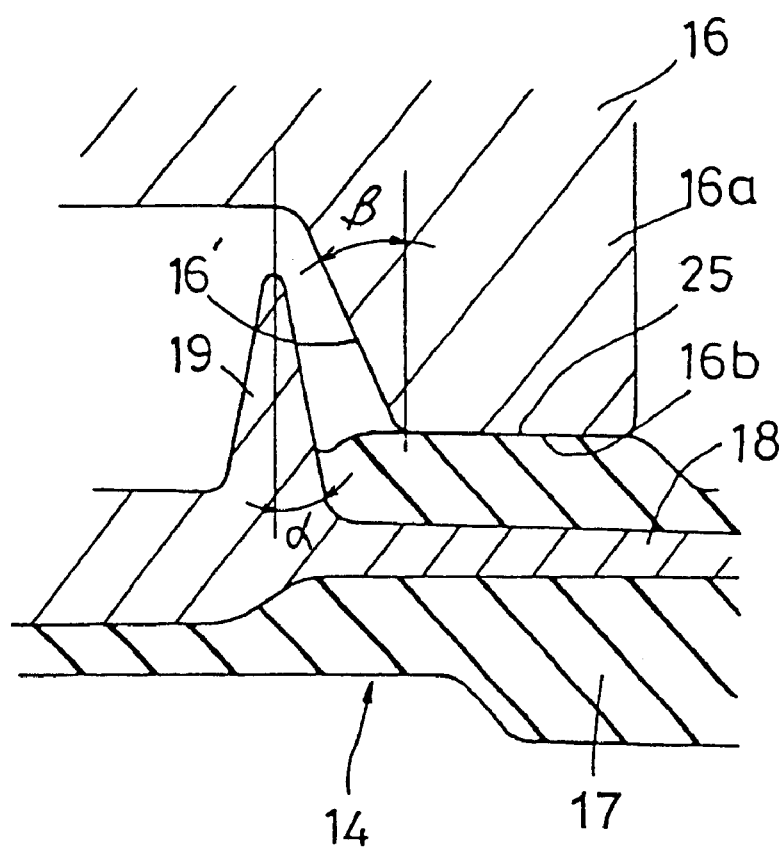
FIG. 4 is a sectional view illustrating the relationship between a crawler belt and a road wheel according to another embodiment of the invention.

FIG. 4 is a sectional view of a fundamental part of the invention, showing the relationship between a crawler belt and a road wheel according to another embodiment. In this embodiment, each road wheel 16 (15) has, at its guide projection sides, inclined surfaces 16' (15') (inclined surfaces 15' are not shown in the drawings) in compliance with the inclination angle α of the outer side surfaces of the guide projections 19 of each core bar 18 embedded in each crawler belt 14. The inclination angle β of the inclined surfaces 16' (15') of the road wheels 16 (15) is greater than the inclination angle α of the guide projections 19. With this arrangement, the load of the road wheels 16 imposed on the road wheel rolling contact sections can be less concentrated upon the joint parts where each guide projection 19 of the core bars 18 joins to the elastic material, similarly to the forgoing embodiment.

Figure 5:
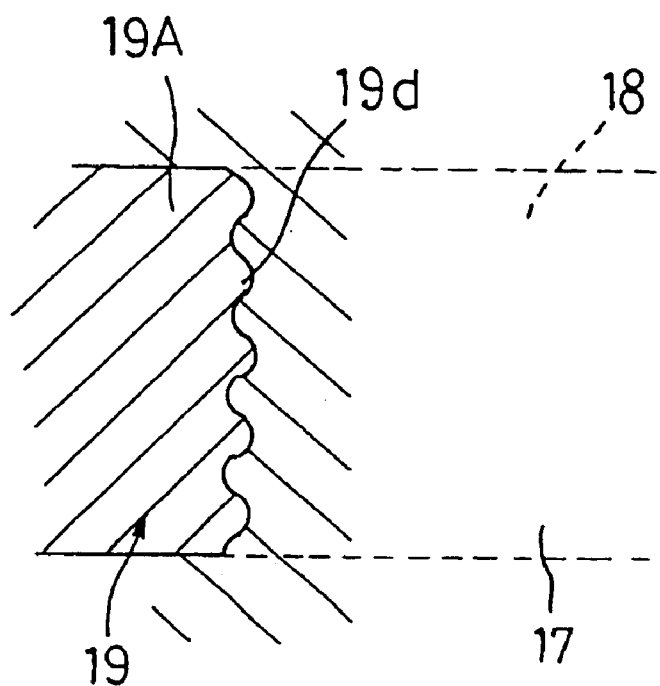
FIG. 5 illustrates a cross section of a joint part in plane, in which a guide projection of a core bar joins to an elastic material according to still another embodiment of the invention.
Figure 6:
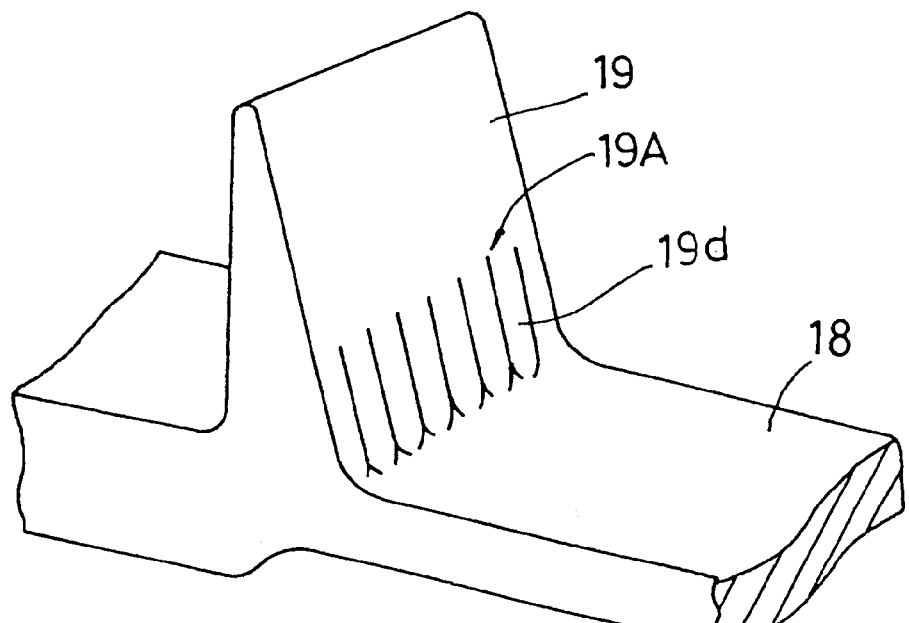
FIGS. 6($a$) and 6($b$) are perspective views of the periphery of a guide projection in which an irregular surface is formed on its root part, FIG. 6($a$) showing a case in which the convex portions and concave portions of the irregular surface are laterally aligned while FIG. 6($b$) shows a case in which the convex portions and concave portions are formed in a cross form.
Figure 6:
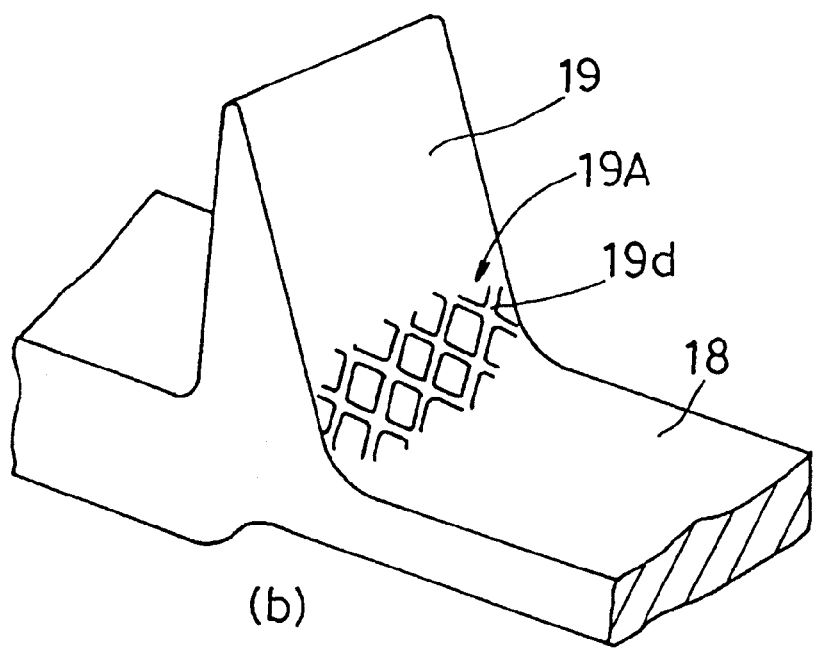

FIG. 5 illustrates a cross section of a joint part in plane, in which a guide projection of a core bar joins to an elastic material according to still another embodiment of the invention. FIGS. 6(a) and 6(b) are perspective views of the periphery of a guide projection in which an irregular surface is formed on its root part, FIG. 6(a) showing a case in which the convex and concave portions of the irregular surface are laterally aligned while FIG. 6(b) shows a case in which the convex and concave portions are formed in a cross form. This embodiment has the same basic structure as the foregoing embodiments and therefore, the parts substantially equivalent to those of the foregoing embodiments will be indicated by the same reference numerals as given to the latter and an explanation on them will be omitted herein.

In this embodiment, at each joint interface part where the elastic material of the crawler belt 17 and a guide projection 19 of the core bar 18 join to each other, a plurality of convex and concave portions 19d are formed on the outer surface of a root part 19A of the guide projection 19 so as to extend from the root toward the end as shown in FIG. 6(a), whereby the joint area (adhesion area) of the root part with respect to the elastic material is increased. With this arrangement, the adhesion of the road wheel rolling contact sections 25 with respect to the outer surfaces of the guide projections 19 of the core bar 18 can be increased at the joint parts in manufacture of the crawler belt 14 and in addition, the traveling system 10 can strongly withstand the load locally imposed by the lower road wheels 16. The convex and concave portions 19d can be formed by stamping a convex and concave pattern on the guide projection parts during manufacture of the core bars 18, which does not incur increased cost. The convex and concave portions 19d may be formed on the root part 19A so as to cross each other as shown in FIG. 6(b). This cross pattern has the same effect as that of the above-described striped pattern.

Figure 7:
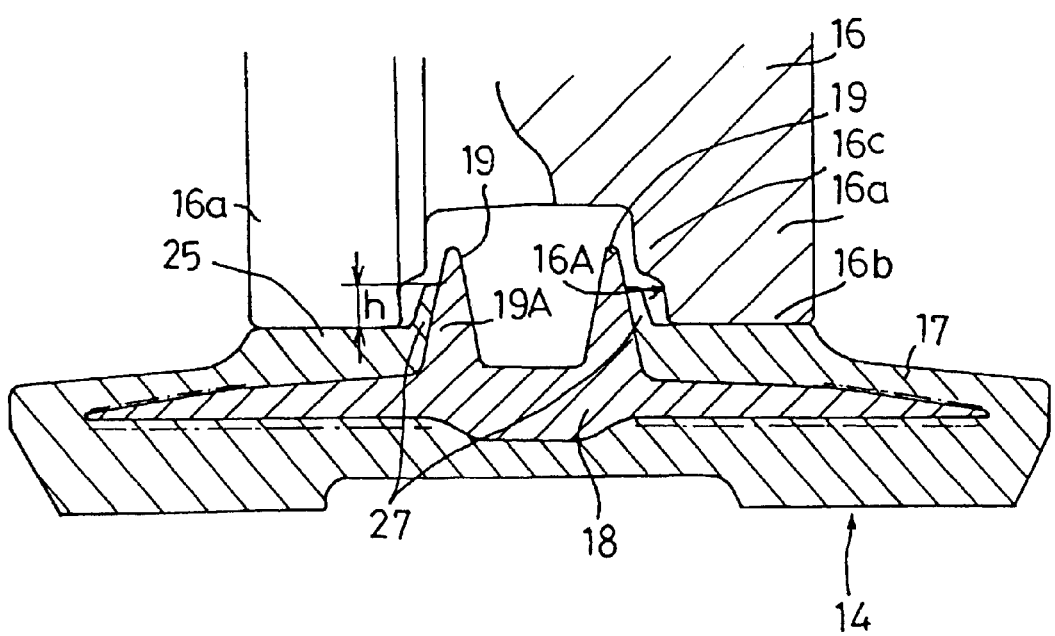
FIG. 7 is a sectional view showing a fundamental part of a crawler belt according to still another embodiment of the invention.
Figure 8:
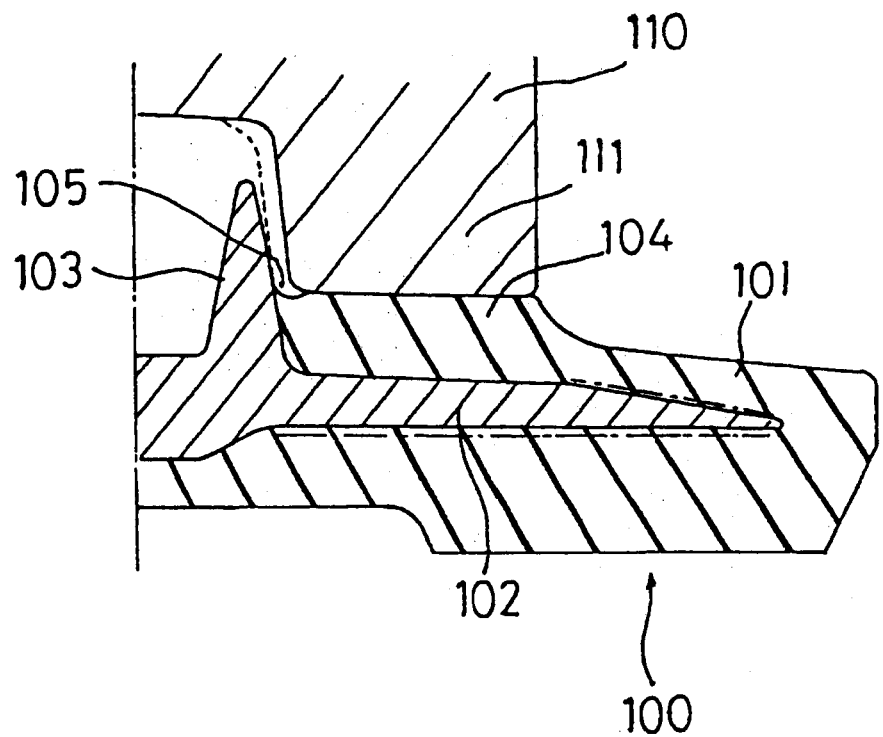
FIG. 8 is a partial cross sectional view illustrating the relationship between a crawler belt and a road wheel in a conventional system.

FIG. 7 is a sectional view showing a fundamental part of a crawler belt according to still another embodiment of the invention. This embodiment is also similar to the foregoing embodiments in terms of the basic structure and therefore, the parts substantially equivalent to those of the foregoing embodiments will be indicated by the same reference numerals as given to the latter and an explanation on them will be omitted herein.

This embodiment is arranged such that, in a core bar embedded section where each core bar 18 is embedded in the crawler belt 14, an elastic material joint part 27 is formed on the joint part where the elastic material of the crawler belt body 17 joins to the outer surface of the guide projection 19. Specifically, the elastic material joint part 27 upwardly extends from a rolling contact surface 25a of the road wheel rolling contact section 25 by a specified height h. In conformity with this, each road wheel 16 is formed such that the inner portion (guide projection side) of the roller section 16a close to the tread 16b has a step-like shape 16A like the foregoing embodiment and the step-like shape portion 16A of the roller section 16a does not come into contact with the above elastic material joint part 27.

In each crawler belt 14, the adhesion surfaces can be increased by virtue of the above arrangement in the elastic body joint part 27 where the root part 19A of the guide projection 19 of the core bar 18 joins to the road wheel rolling contact section 25 of the crawler belt body 17, which leads to improved adhesive quality. In addition, the abutting area between the road wheel rolling contact section 25 and the guide projection 19 can be reinforced by expanding the elastic body joint part 27 which extends from the crawler belt body 17 and leans against the guide projection 19. Further, since concentration of a local stress upon the root part 19A of each guide projection 19 can be avoided by forming the inner portion of the roller section 16a of the road wheel 16, which inner portion is close to the tread 16b, into the step-like shape 16A such that it does not come into contact with the elastic material joint part 27, damage caused by cracking, which is likely to occur in the regions near the guide projections of the crawler belts in the conventional systems, can be prevented by ensuring strong adhesion and stress dispersion. In consequence, a crawler belt type traveling system having high durability can be achieved. Such an arrangement can be made at a time during molding of the elastic crawler belts and therefore has the advantage of not incurring increased cost.

In the crawler belts having the above structure, the provision of irregularity in the outer surfaces of the root parts 19A of the guide projections 19 of the core bars 18 further improves adhesive quality in the elastic body joint parts 27, similarly to the foregoing embodiment.

While the invention has been described with the concept of a crawler belt type traveling system applied to a crawler dump, the invention is not limited to this but used in other applications which include not only construction machines such as hydraulic shovels but also agricultural machinery which employs a crawler belt type traveling system.

What is claimed is:

1. A crawler belt type traveling system comprising:

crawler belts formed from an elastic material, each crawler belt having core bars embedded therein so as to be aligned at specified intervals in a longitudinal direction of the crawler belt, the core bars each having a pair of guide projections at the center thereof with respect to a widthwise direction of the crawler belt, the pair of guide projection being aligned in a widthwise direction of the crawler belt, and road wheels each attached to a vehicle body so as to come into rolling contact with a portion outside the pair of guide projections, wherein each road wheel rolls on road wheel rolling contact sections of each crawler belt, which are formed from the elastic material, with its tread being away from the crawler belt side of a root part of each guide projection.

2. A crawler belt type traveling system according to claim 1, wherein the guide projection sides of the periphery of each road wheel are formed into a step-like shape so as to be apart from the root parts of the guide projections.

3. A crawler belt type traveling system according to claim 1, wherein the guide projection sides of each road wheel are inclined at an angle greater than the inclination angle of the guide projections.

4. A crawler belt type traveling system according to claim 1, wherein the portions of each crawler belt close to the root parts of the guide projections are respectively provided with a recess which is larger than the volume of elastic deformation caused by the maximum vehicle body load which acts via the road wheel rolling contact sections.

5. A crawler belt type traveling system according to claim 1 or 4, wherein an irregular surface is formed at least in an adhesive interface between the elastic material and the outer surface of each guide projection of each core bar.

6. A crawler belt type traveling system comprising:

crawler belts formed from an elastic material, each crawler belt having core bars embedded therein so as to be aligned at specified intervals in a longitudinal direction of the crawler belt, the core bars each having a pair of guide projections at the center thereof with respect to a widthwise direction of the crawler belt, the pair of guide projections being aligned in a widthwise direction of the crawler belt, and road wheels each attached to a vehicle body so as to come into rolling contact with a portion outside the pair of guide projections, wherein the elastic material of each crawler belt is adhered so as to extend from the crawler belt side of a root part of each guide projection to a position having a specified height along the outer surface of the guide projection, and wherein the guide projection sides of each road wheel are respectively formed into a step-like shape so as not to come into contact with joint parts where the elastic material joins to a guide projection.

* * * * *